(12) United States Patent
Hillman

(10) Patent No.: US 11,145,109 B1
(45) Date of Patent: Oct. 12, 2021

(54) METHOD FOR EDITING COMPUTER-GENERATED IMAGES TO MAINTAIN ALIGNMENT BETWEEN OBJECTS SPECIFIED IN FRAME SPACE AND OBJECTS SPECIFIED IN SCENE SPACE

(71) Applicant: Weta Digital Limited, Wellington (NZ)

(72) Inventor: Peter M. Hillman, Wellington (NZ)

(73) Assignee: Weta Digital Limited, Wellington (NZ)

( * ) Notice: Subject to any disclaimer, the term of this patent is extended or adjusted under 35 U.S.C. 154(b) by 0 days.

(21) Appl. No.: 17/221,119

(22) Filed: Apr. 2, 2021

Related U.S. Application Data

(60) Provisional application No. 63/087,832, filed on Oct. 5, 2020.

(51) Int. Cl.
*G06T 15/04* (2011.01)
*G06T 7/73* (2017.01)
*G06T 7/246* (2017.01)
*G06T 15/20* (2011.01)

(52) U.S. Cl.
CPC .............. *G06T 15/04* (2013.01); *G06T 7/246* (2017.01); *G06T 7/74* (2017.01); *G06T 15/20* (2013.01)

(58) Field of Classification Search
None
See application file for complete search history.

(56) References Cited

U.S. PATENT DOCUMENTS

| | | | |
|---|---|---|---|
| 6,567,983 B1 * | 5/2003 | Shiimori | H04N 1/00198 709/203 |
| 2010/0031149 A1 * | 2/2010 | Gentile | H04N 5/91 715/723 |
| 2018/0012256 A1 * | 1/2018 | Napchi | G06Q 30/0257 |

* cited by examiner

*Primary Examiner* — Frank S Chen
(74) *Attorney, Agent, or Firm* — Philip H. Albert; Haynes and Boone, LLP

(57) ABSTRACT

In an image processing system, artist specifications for an inserted object that are specified in frame space are aligned with object points in a virtual scene space. For other frames, where the object points move in the frame space, the object movements are applied to the inserted object in the frame space.

16 Claims, 11 Drawing Sheets

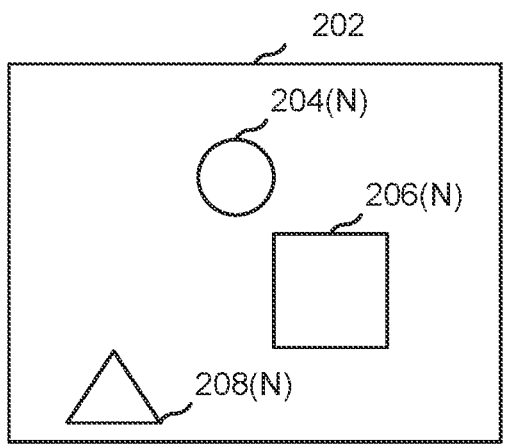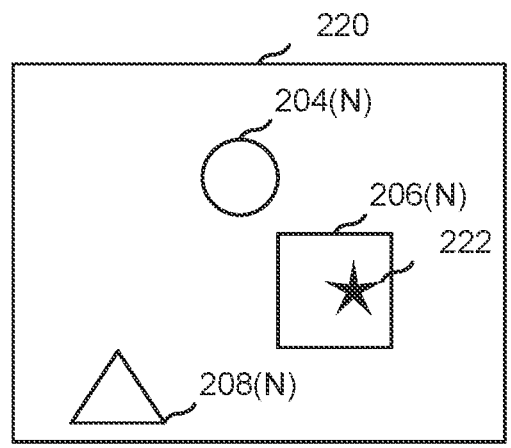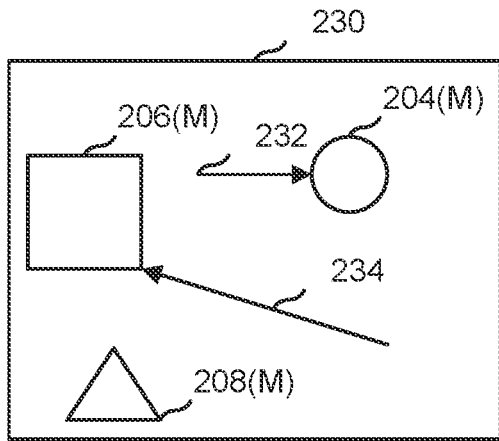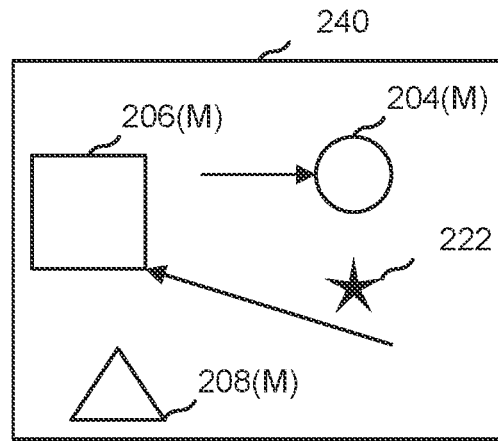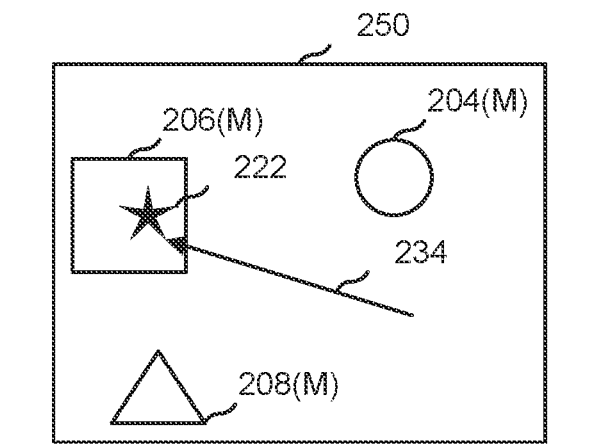
FIG. 2

METHOD FOR EDITING COMPUTER-GENERATED IMAGES TO MAINTAIN ALIGNMENT BETWEEN OBJECTS SPECIFIED IN FRAME SPACE AND OBJECTS SPECIFIED IN SCENE SPACE

CROSS-REFERENCE TO RELATED APPLICATIONS

This application claims the benefit of U.S. Provisional Application No. 63/087,832 filed on Oct. 5, 2020, which is incorporated by reference in its entirety for all purposes.

FIELD OF THE INVENTION

The present disclosure generally relates to computer graphics processing, and more particularly to editing computer-generated images via editing in frame space and representations of image insertions in scene space.

BACKGROUND

A computer imaging system might generate a computer-generated image by taking in an input description of objects positioned in a coordinate system of a virtual scene space, taking on a definition of a virtual camera position and a virtual camera view frame, and then generating one or more images of what the camera "sees" from the virtual camera position. The virtual scene space might be a three-dimensional (3D) space. A scene specification might be an input to the computer imaging system, wherein a scene specification specifies objects to appear in a virtual scene, object positions in the virtual scene space, lighting and lighting positions in the virtual scene space. The computer imaging system might use a renderer to render frame images of what is seen in the scene space. An output might be a two-dimensional (2D) pixel array, a deep pixel array (having pixel values for multiple depths), and/or two 2D images for stereoscopic imagery. The image or images depicted in the output would be in frame space, which is determined in part by the virtual camera location and the position in the scene space of the virtual camera view frame.

In some editing steps, an artist (a user who edits images, animation, etc. or the like) might modify a resulting image by editing a scene specification to move objects, add objects, etc., and have the scene rerendered.

Rendering can be a compute-intensive operation, especially when multiple frames are needed, such as the rendering of a video sequence. As a result, some post-render edits might be composited in frame space onto a frame output and for consistency, might require edits to many frames of a video sequence. This can be a tedious process, in particular, if the number of images ranges in the hundreds or thousands. Therefore, improvements are needed to streamline the editing process for inserting an image object in computer-generated images.

BRIEF DESCRIPTION OF THE DRAWINGS

Various embodiments in accordance with the present disclosure will be described with reference to the drawings, in which:

FIG. 2 illustrates an example of editing in a frame space.

DETAILED DESCRIPTION

Figure 1:
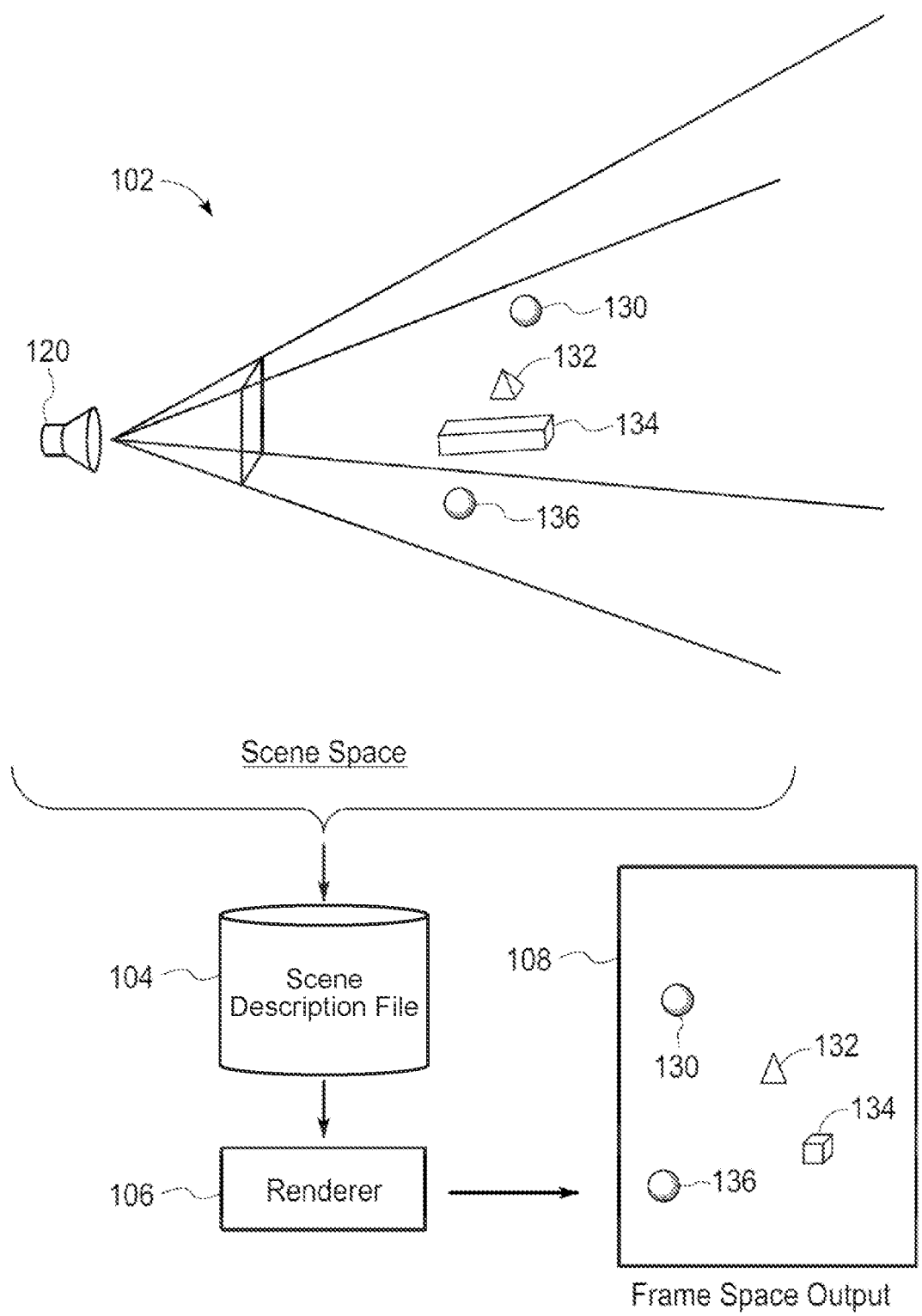
FIG. 1 illustrates a process of rendering from a virtual scene space description to form an image frame.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Computer-generated imagery might comprise images or sequences of images or frames having a time component that form a video sequence. An animation processing system might take in video frames captured from live action and alter them to produce a resulting video that is different than what was actually present in the live action scene. In one instance, one or more images or frames in the video sequence are edited to include an object image, for example, attached to, or relative to, a specific character or object that appears in those images or frames. To streamline and efficiently edit those images or frames, those images or frames are processed to identify the pixels and/or coordinates of the specific character, along with the character's movements in those images or frames. Once the pixels and/or coordinates of the specific character are identified, the object image to be inserted (e.g., attached to or put in relative to the specific character) can be placed so that the coordinates associated the object image and the coordinates of the specific character can be associated in the screen space. In such association, the coordinates of the object image can be tracked relative to the coordinates of the specific character. In doing so, as the specific character moves within the images or frames, the inserted object image can be tracked relative and be placed automatically.

A computer graphics system might have a user interface that a user (such as an artist creating or modifying imagery) uses to view a frame of a video sequence, an input frame. The artist might specify edits to the contents of the input frame, such as placement of another object that covers an object present in the scene represented in the input frame. Thus, the artist can work in frame space and provide for an image insertion. In the frame space, the image insertion could appear as something added to a portion of the input frame but what the computer graphics system is to treat as something added to an object depicted in the input frame so that the image insertion in subsequent frames appears as having been attached to that object. More generally, the artist can paint an image insertion onto the input frame and the computer graphics system determines an attachment object set, of the one or more objects that the image insertion will remain connected to as those one or more objects move over a sequence of frames. In a specific example, a texture can be painted on an image frame of a person such that the texture is a pattern that is applied to an arm of the person and as the person and the arm move in the video, the pattern follows the arm, rotating, translating, deforming, etc. so as to approximately appear as being attached to the arm in the scene space even though it is not necessarily included in a rendering process.

The computer graphics system maintains a point association for the image insertion, which can be stored as a data structure. The point association provides a mapping or connection between reference coordinates in the scene space of the object being attached to and the coordinates of the corresponding point on the image insertion. The reference coordinates of the object maintain a relative position to the object as the object moves around a scene (and/or a camera moves in the scene) and thus might represent motion vectors relative to a scene coordinate system. A correspondence vector, which also can be stored as data, represents correspondence between a reference point position in the input frame and the same point in a second frame.

In some instances, the movements of the specific character and the inserted object image can be tracked from one point of view to another point of view, for example, from one perspective of camera position to another perspective position. The correspondence between the coordinates of the specific character and the inserted object image can be considered as a motion vector that relates relative positions of the specific character and the inserted object image. In some instances, once a reference image frame is determined to identify the coordinates of the specific character and the inserted object image, any other images or frames within the video sequence can be retroactively implemented to insert the object image onto or relative to, the specific character, object, etc. In doing so, instead of manually editing each image frame within the video sequence in the screen space, which can be repeated hundreds or thousands of times, an object image can be inserted or placed relative to a specific character once in reference space, and all other instances of images or frames in which the specific character appears can be automatically traced, tracked and inserted, in both two-dimensional images or three-dimensional renderings in the video sequence. The following figures and disclosures are examples included to illustrate the method of editing computer-generated images via editing in screen space and representations of image insertions in reference space.

FIG. 1 illustrates a process of rendering from a virtual scene space description to form an image frame. As shown there, a scene 102 might be described by data stored as a scene description file 104, which can be passed to a renderer 106 to render image 108. The scene description file 104 might include a specification of a position of a virtual camera 120 and a position and extent of a camera view frame 122 having a border that would coincide with edges of the image 108. Objects 130, 132, 136, and 138 are shown having positions in scene space and are shown in image 108 in frame space. Some computer graphics editing systems might include an ability for a user, such as an artist, to manipulate objects in the scene space, but often there is a desire to edit in the frame space, as in painting onto image 108, but have the image insertions that are painted on be "attached" to one or more objects in the scene so that in subsequent or prior frames in a video sequence, the image insertions can be composited or added onto each frame without requiring the artist to paint every frame in which the image insertion is to appear.

FIG. 2 illustrates an example of editing in a frame space. As shown there, a frame N 202 might be rendered by a renderer from a scene description file. In this example, the scene description file would define three objects—circle 204, square 206, and triangle 208—as having locations in the scene space such that they are visible within the camera view frame and thus appear on frame N 202. Frame N 202 might be one of several frames of a video sequence. For simplicity of depiction, the example objects in FIG. 2 appear as 2D objects, but it should be understood that the teachings here apply as well to 3D objects.

Using an image editing tool, an artist might add an image insertion—in this example, a star 222—to frame N 202 to form an edited frame N 220. The image insertion might be a tattoo, a label, a texture, etc. that is intended to remain in relative position to some object over the course of a video sequence. The video sequence might be a small part of a larger video sequence (e.g., part of a longer video might have the image insertion while another part does not, or has some other image insertion) and while in this example, the frame space location of the image insertion of star 222 (e.g., the pixels of a 2D pixel array occupied by the image insertion) overlaps with the frame space location of square 206, this need not be the case. For example, an artist might paint a halo above and to the side of a head of a character in a manner that the halo does not coincide in the frame with any part of the head. In FIG. 2, the references 204(N), 206(N), and 208(N) designate the depicted objects in positions they have in frame N.

Where the objects are in motion in the video frame, in a second frame—here Frame M—the objects might appear at different positions in the frame. Frame M might be a frame in the video sequence immediately subsequent to Frame N, immediately prior, or some number of frames distant from Frame N, either subsequent or prior. In some editing systems, the number of intervening frames might be limited for conserving computational efforts or other reasons. As illustrated, Frame M 230 depicts circle 204(M), square 206(M), and triangle 208(M) in positions for Frame M. Circle 204(M) has moved relative to circle 204(N), as represented by a motion vector 232, while square 206(M) has moved relative to square 206(M) as represented by a motion vector 234, and triangle 208(M) has not moved.

Frame 240 depicts Frame M with the edits made to Frame N, including star 222. This might be the desired result if star 222 is not to be connected to square 206. However, it is often the case that the artist is designating star 222 as being applied to, attached to, connected to, or similarly associated with an attachment object set that comprises square 206. In that case, the result would be frame 250, wherein star 222 moves according to motion vector 234.

In the simplified examples of FIG. 2, each object and the image insertion appear as rigid 2D objects that are simply translated. As explained herein, the computer graphics editing system can also handle more complex cases, such as rotation, shearing, occluding, bending, etc. of the objects. In part, this can be addressed using a point association data structure that associates multiple points on an object with corresponding points on an image insertion.

Figure 3:
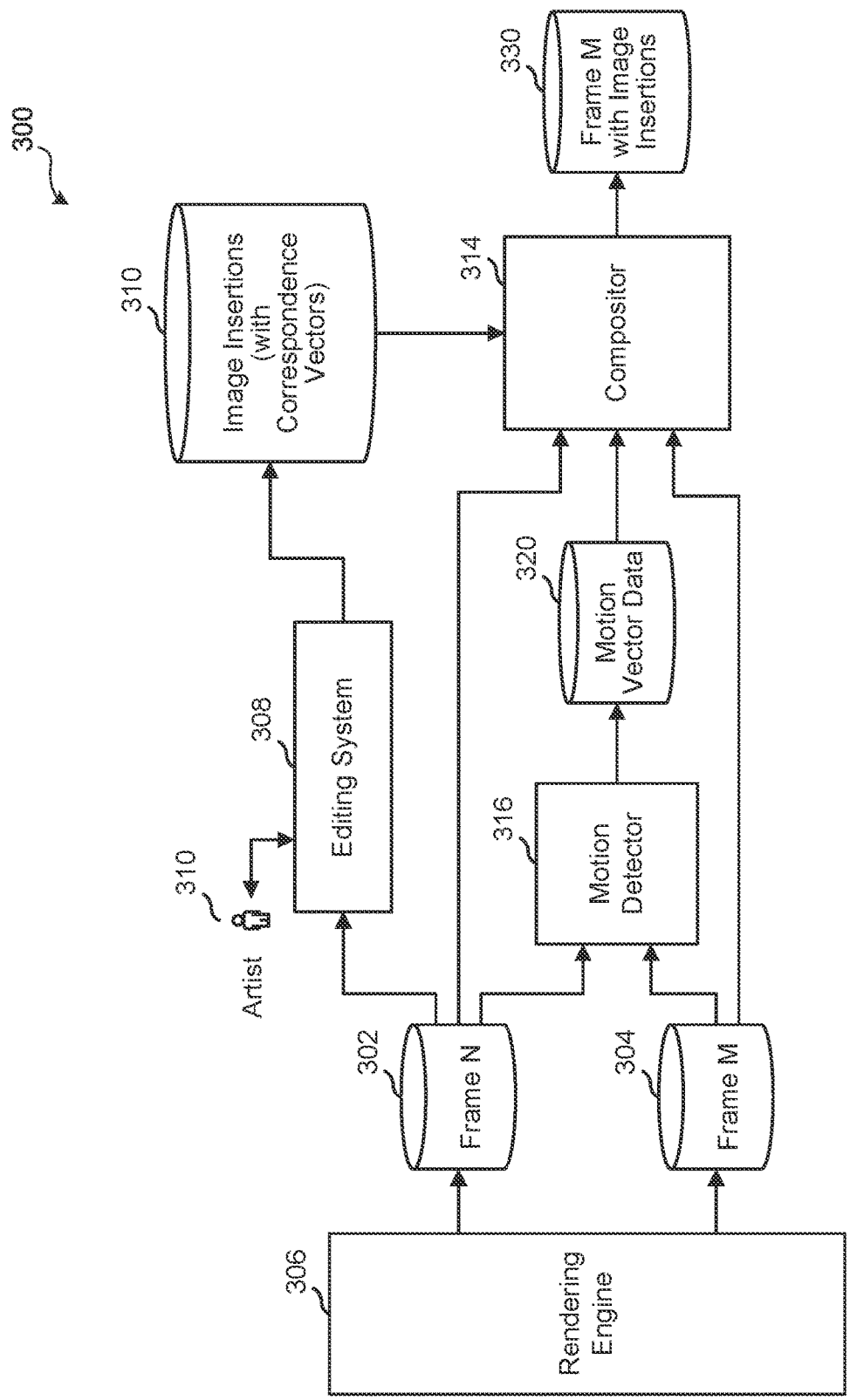
FIG. 3 illustrates a system for editing in frame space and generating correspondence vectors for use in other frames.

FIG. 3 illustrates a system 300 for editing in frame space and generating correspondence vectors for use in other frames. As illustrated there, a frame N 302 might be provided as an input frame and a frame M 304 might be provided as a second frame. These frames might be generated by a renderer 306. An editing system 308 might take as input frame N 302 and an artist 310 might use the editing system 308 to edit frame N to create image insertions and specify objects in frame N to associate the image insertions with. Editing system 308 might output an image insertions dataset 310 that could include correspondence vectors. Image insertions dataset 310 could be an input to a compositor 314.

A motion detector 316 detects motion between frame N and frame M. Where the entirety of content, or relevant portions of content, in frames N and M are computer generated, motion detector 316 can determine motion by simply examining scene description data that indicates how objects are to move between frames. Motion detector 316 outputs motion vector data 320 that is provided to compositor 314. Compositor 314 can then use these inputs to generate a frame M 330 that comprises objects from frame M and image insertions associated with one or more object in frame M where the image insertions track movements of points corresponding to those objects.

Figure 4:
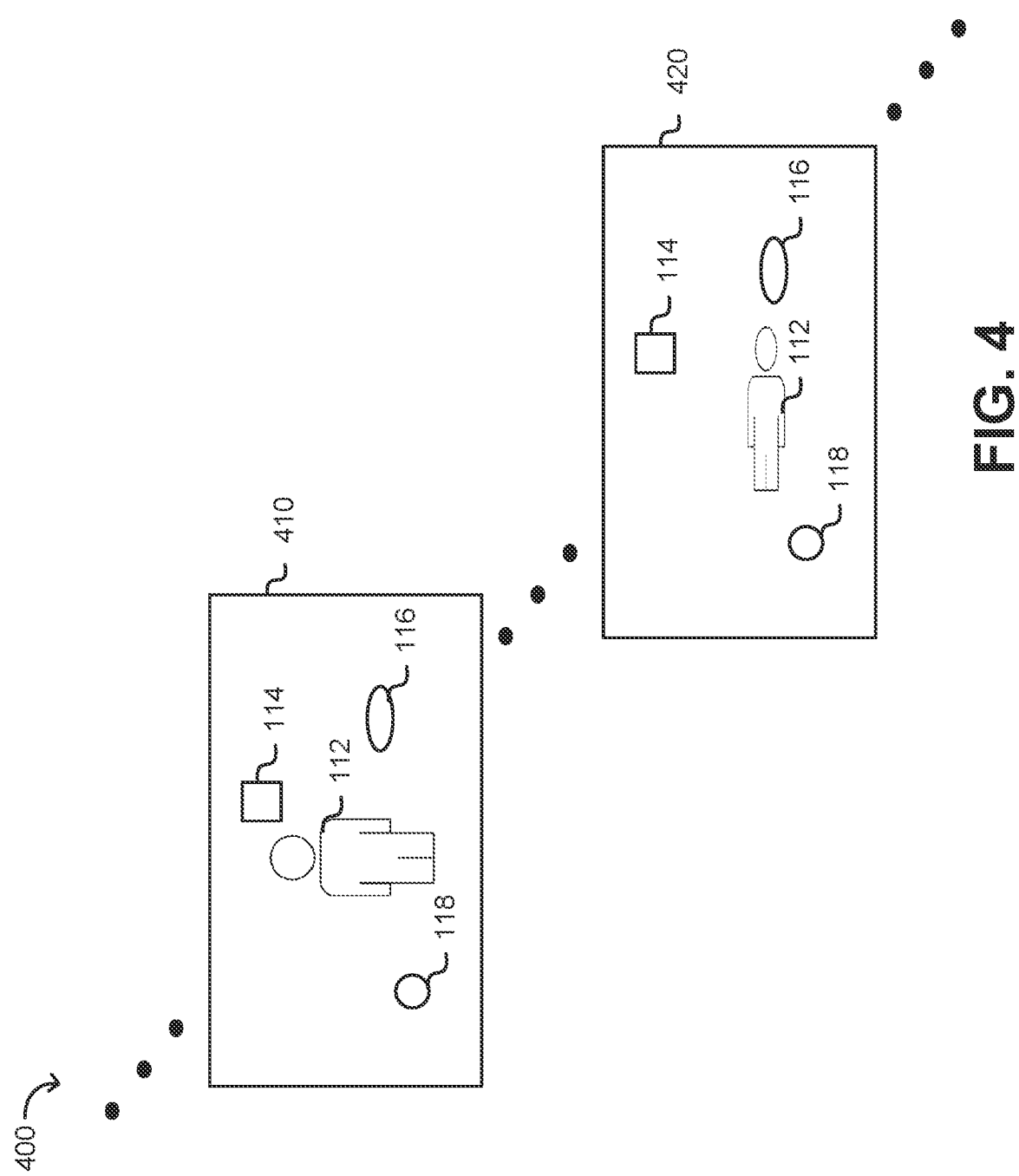
FIG. 4 illustrates a video sequence showing a series of generated images or frames that show various objects and a specific character.

FIG. 4 illustrates a video sequence 400 showing a series of generated images or frames (also referred to herein as "image frame") that show various objects and a specific character. The video sequence 400 includes an image frame 410 showing a specific character 412 and objects 414, 416, and 418 in a captured scene. The video sequence 400 also includes another image frame 420, which appears at a specific time or a specific number of image frames after the image frame 410. In the image frame 420, the position of the specific character 412 has changed with respect to the original position captured in the image frame 410, indicating a movement of the specific character 412 with respect to others, e.g., objects 414, 416, and 418. Although not explicitly illustrated in FIG. 4, it can be understood that the video sequence 400 can include many more captured scenes showing the specific character 412 in other image frames within the video sequence 400.

Figure 5:
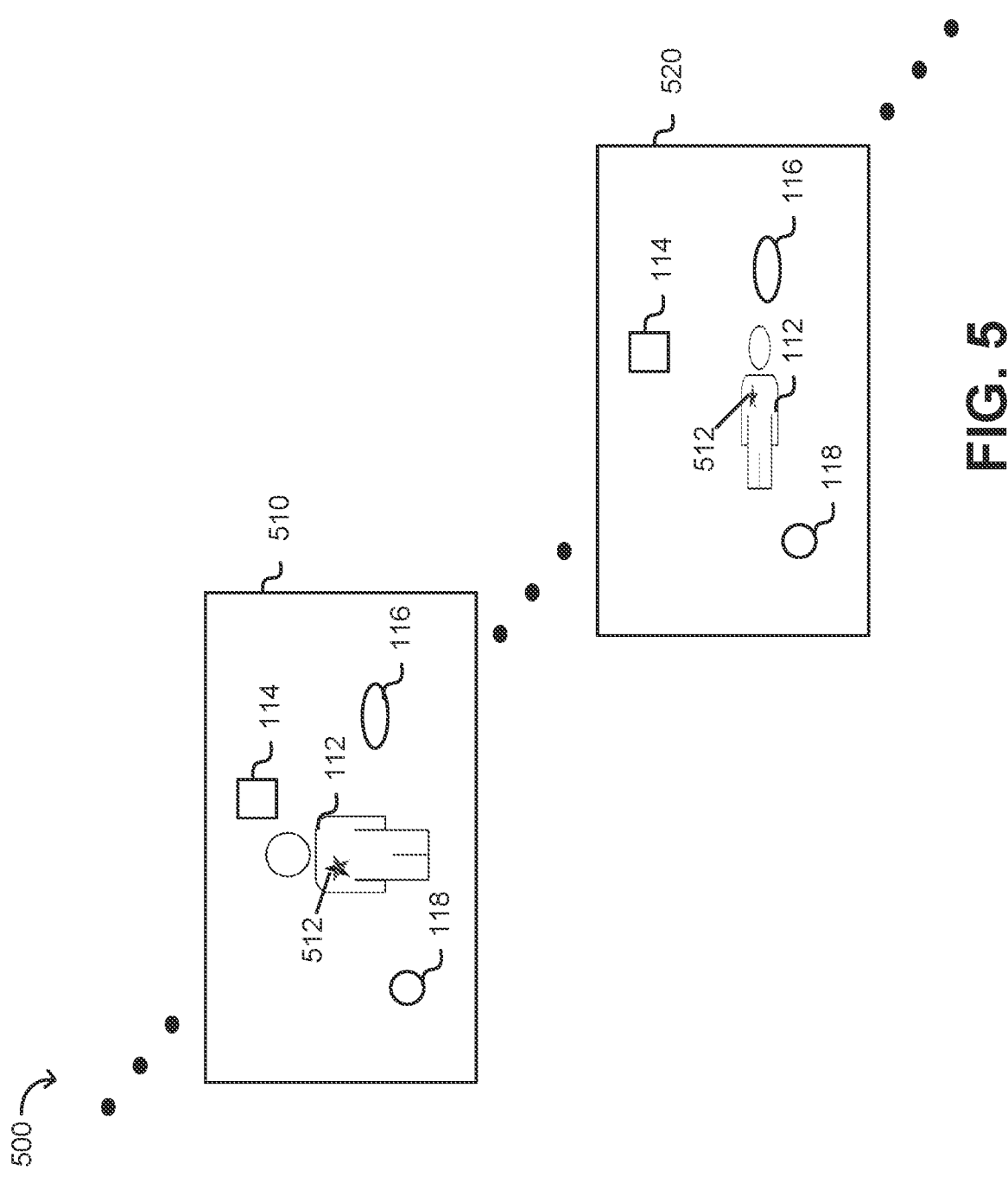
FIG. 5 illustrates a video sequence showing a series of generated images or frames that include various objects and a specific character having an inserted object image.

FIG. 5 illustrates a video sequence 500 showing a series of generated images or frames that include various objects and a specific character having an inserted object image. The video sequence 500 includes an image frame 510 showing the specific character 412 and objects 414, 416, and 418 in the captured scene of the image frame 410 with an object image 512 inserted or placed relative to the specific character 412. Prior to placing object image 512 on or relative to the specific character 412, coordinates of the specific character 412 are determined for all the image frames in which the specific character 412 appears to obtain the reference coordinates of the specific character 412. When placing or inserting object image 512, relative coordinates of the specific character 412 and object image 512 are determined to obtain a correspondence vector to track movements of the specific character 412 in order to place or insert object image 512, as illustrated in image frame 520 of the video sequence 500.

As illustrated in FIG. 5, the image frame 520 occurs at a specific time or a specific number of imrt age frames after the image frame 510. In the image frame 520, the position of the specific character 412 has changed with respect to the original position captured in the image frame 510, indicating a movement of the specific character 412 with respect to others, e.g., objects 414, 416, and 418. Using a correspondence vector approach to reference coordinates from the movement of the specific character 412, object image 512 can be placed onto or relative to the specific character 412 in the image frame 520. That is, object image 512 is placed in the image frame 520 without manual insertion, and by simple using correspondence vector by tracking motion of the specific character 412. In addition, object image 512 in the image frame 510 appears drastically different from object image 512 illustrated in the image frame 520 to indicate that the three-dimensional rendering that takes into account different perspectives depicted in the two different scenes, or camera positions. As illustrated, object image 512 appears on the upper left chest of the specific character 412 is maintained in both image frames 510 and 520, although the positions and coordinates of object image 512 with respect to objects 414, 416, and 418 have changed in the two image frames. Although not explicitly illustrated in FIG. 5, it can be understood that the video sequence 500 can include many more captured scenes showing the specific character 412 having object image 512 attached thereto, or placed relative to, in any other image frames within the video sequence 500.

Figure 6:
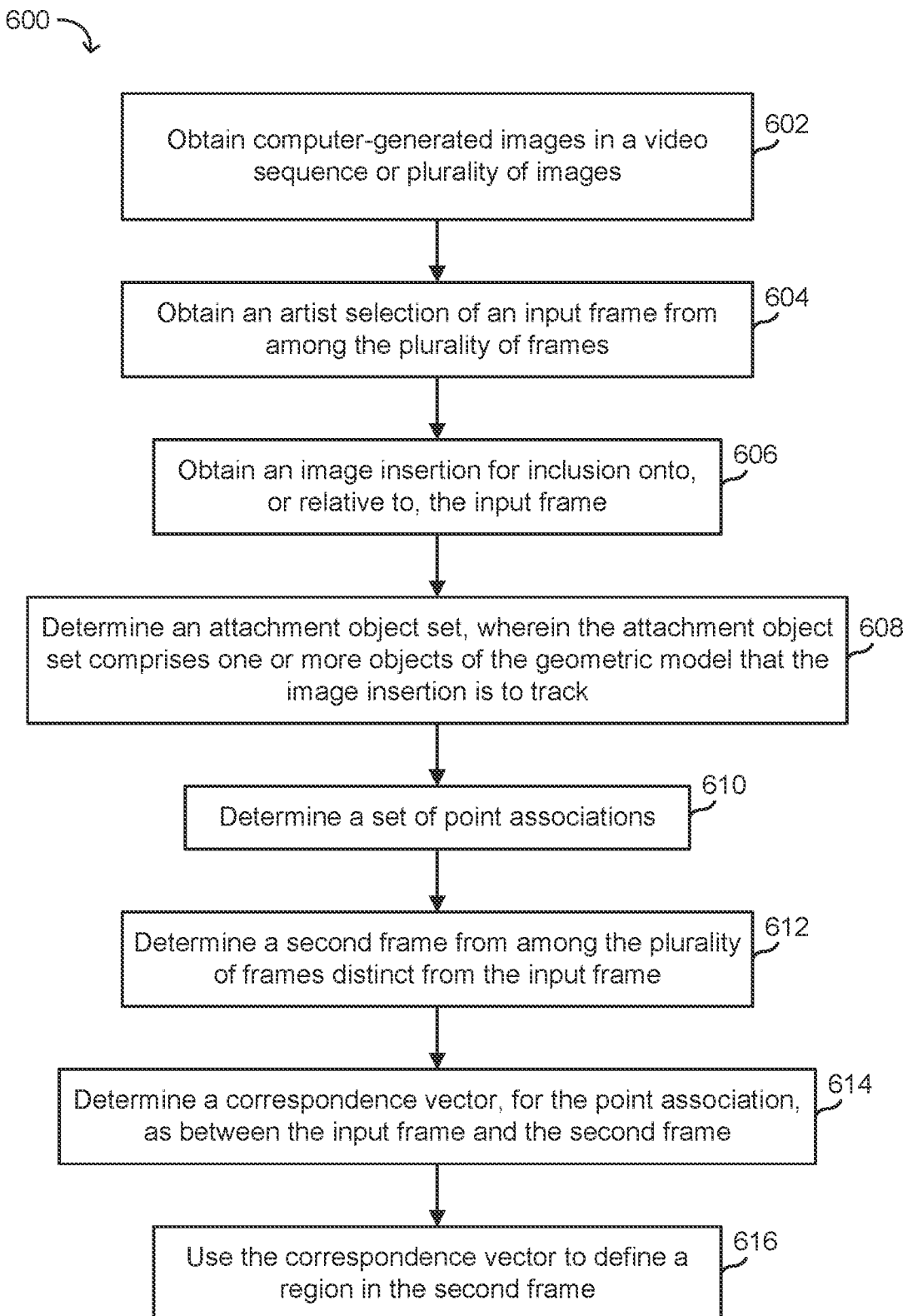
FIG. 6 illustrates a flowchart for editing computer-generated images via correspondence vector approach, according to an embodiment.

FIG. 6 illustrates a flowchart for a computer-implemented method 600 for editing computer-generated images via correspondence vector approach. In accordance with the disclosure herein, one or more computer systems is used for implementing the method of editing or processing image data.

As illustrated in FIG. 6, the method 600 includes, at 602, obtaining generated imagery comprising a video sequence or a plurality of image frames representing objects of a geometric model positioned in a virtual scene space. In some instances, the movement of the objects in the virtual scene space is tracked. In some instances, the movements and positions of the generated imagery are tracked from a perspective of a camera position in the virtual scene space to other perspectives of camera position.

At 604, the method 600 includes obtaining a selection of an input frame from among the plurality of frames (i.e., image frames), for example, in a video sequence, such as video sequences 400 or 500 as described with respect to FIGS. 4 and 5.

The method 600 includes, at 606, obtaining an image insertion for inclusion onto, or relative to, the input frame, such as, for example, identifying the image frames where the specific character 412, object, etc., appears in the video sequences 400 or 500, as described with respect to FIGS. 4 and 5.

At 608, the method 600 further includes determining an attachment object set, wherein the attachment object set comprises one or more objects of the geometric model that the image insertion is to track.

The method 600, then, includes determining a set of point associations, at 610. In determining the point associations, a first point association in the set of point associations can be designated as a first data structure. For example, the first data structure represents reference coordinates of a first point on a first object of the attachment object set. As described above, the reference coordinate is a set of coordinates independent of at least one position change, in the virtual scene space, of the first object. The first data structure also represents a second point on the image insertion, and a position, in the input frame, of the second point relative to the first point.

At 612, the method 600 includes determining a second frame from among the plurality of frames (e.g., of the video sequences 400 or 500) distinct from the input frame. In some instances, the first frame and second frame can be adjacent frames or can be separated by a specific amount of time or image frames, such as in the video sequences 400 or 500.

Once the first and second frames are determined, the method 600 further includes, at 614, determining a correspondence vector, for the point association, as between the input frame and the second frame. In such instances, the correspondence vector represents changes in position in frame space of the first point from the input frame to the second frame. In some instances, the correspondence vector can be used to track the motion of the inserted image and adapted to any other frames within the plurality of frames.

Furthermore, the method 600 can optionally include, at 616, using the correspondence vector to define a region in the second frame for further editing.

Figure 7:
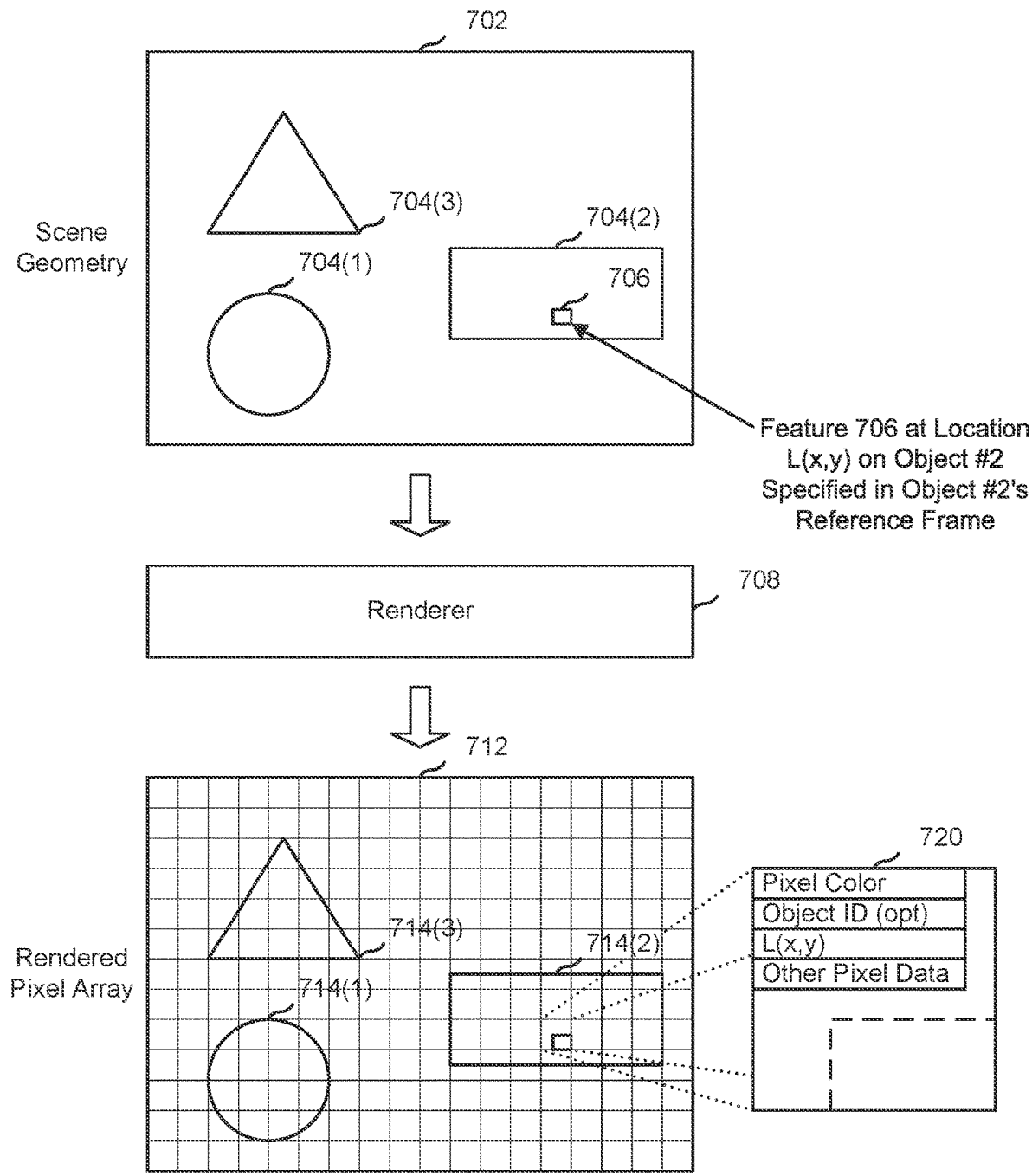
FIG. 7 illustrates an association between pixel of a rendered image and their origin points on objects of a scene.

FIG. 7 illustrates an association between pixel of a rendered image and their origin points on objects of a scene. As illustrated there, a renderer 708 might process scene geometry 702 that includes circle 704(1), rectangle 704(2), and triangle 704(3), with rectangle 704(2) having a feature 706 that has a location specified in a reference frame of rectangle 704(2). An output of renderer 708 might be a rendered pixel array 712, wherein pixels of rendered pixel array 712 are represented by pixel data structures. In the example shown, various pixels in rendered pixel array 712 are assigned values corresponding to objects from scene geometry 702, such as circle 714(1), rectangle 714(2), and triangle 714(3). One such pixel data structure, pixel 720 data structure, is illustrated in FIG. 7. As illustrated there, pixel 720 data structure might comprise a pixel color value, an optional object ID that would reference rectangle 714(2), a corresponding location, L(x,y), representing a location on the object that is rendered at that pixel (e.g., rectangle 714(2)), and possibly other pixel-specific data. By rendering in this manner and storing at least some indication of a location on an object in the object's reference frame in scene geometry, two images or frames can be processed to identify instances where some location that was on an object in the scene geometry is present in both images or frames. The pixel position of a first pixel in a first image or frame that has a pixel data structure indicating that the first pixel is a render of the location on the scene geometry and the pixel position of a second pixel in a second image or frame that has a pixel data structure indicating that the second pixel is also a render of the location on the scene geometry can form a relative motion vector. For example, if one image contains a pixel that has a data element indicating that the pixel was rendered, at least in part, based on what was at location L(x,y) on object #2 in a scene geometry and another image contains a pixel that has a data element indicating that that pixel was rendered, at least in part, based that same location L(x,y), an image processor can infer a motion vector from relative positions of those pixels. In some cases, where there is not a one-to-one correspondence between features of an object and pixels, data elements of a neighborhood of pixels might be considered.

Figure 8:
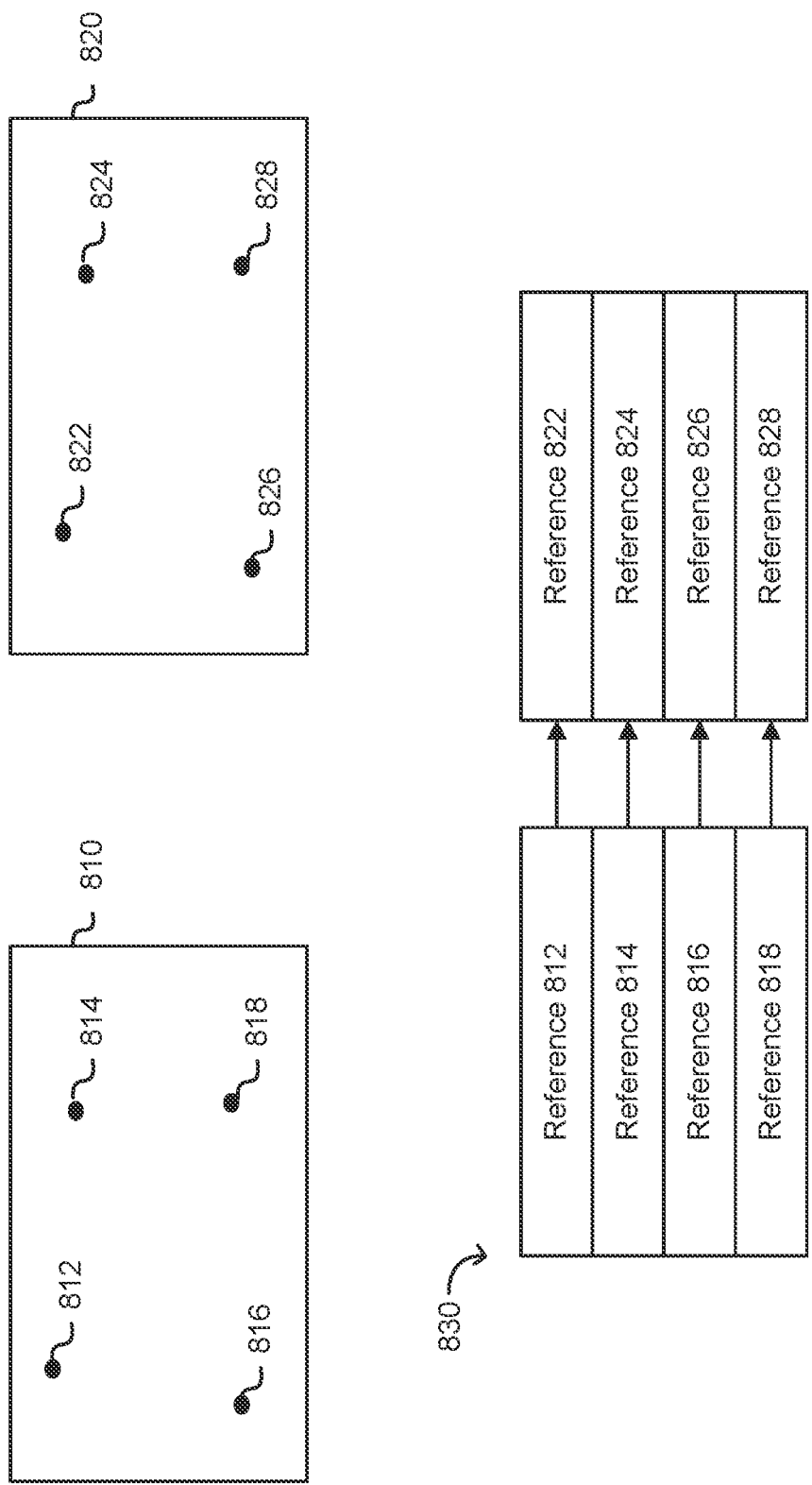
FIG. 8 illustrates point association that provides a mapping or connection between reference coordinates in the scene space of an object being attached to and the coordinates of a corresponding point on an image insertion, according to various embodiments.

FIG. 8 illustrates point association that provides a mapping or connection between reference coordinates (points) in the scene space of an object being attached to and the coordinates of a corresponding reference point on an image insertion, according to various embodiments. As shown in FIG. 8, the object in frame 810 includes reference coordinates 812, 814, 816, and 818 in the scene space and the image insertion in frame 820 includes corresponding reference points 822, 824, 826, and 828. Using point association, an image insertion can be processed automatically to other frames by generating vectors representing movements of reference points, which can then be used to move additional objects in synchronization with other objects in the frame.

According to one embodiment, the process to implement point association can include an artist first selecting an input frame, e.g., frame 810, and inputting an image insertion, e.g., frame 820 onto, or in relative to the input frame 810. The processor can then determine which object in the input frame 810 is the attach object and to which the image insertion is to be attached to. Then, the processor determines a set of point association, wherein a point association is a data structure representing a first point on the attach object, by reference coordinates of the first point, and a second point on the image insertion. The process then determines a motion vector in between two or more frames, e.g., frames 810 and 820. The motion vector represents changes of the reference coordinates between the two frames, which the process applies to other frames. This is further illustrated by table 830 in FIG. 8 which shows one-to-one correspondence between the reference coordinates 812, 814, 816, and 818 of the scene space and their corresponding reference points 822, 824, 826, and 828 in the image insertion.

Figure 9:
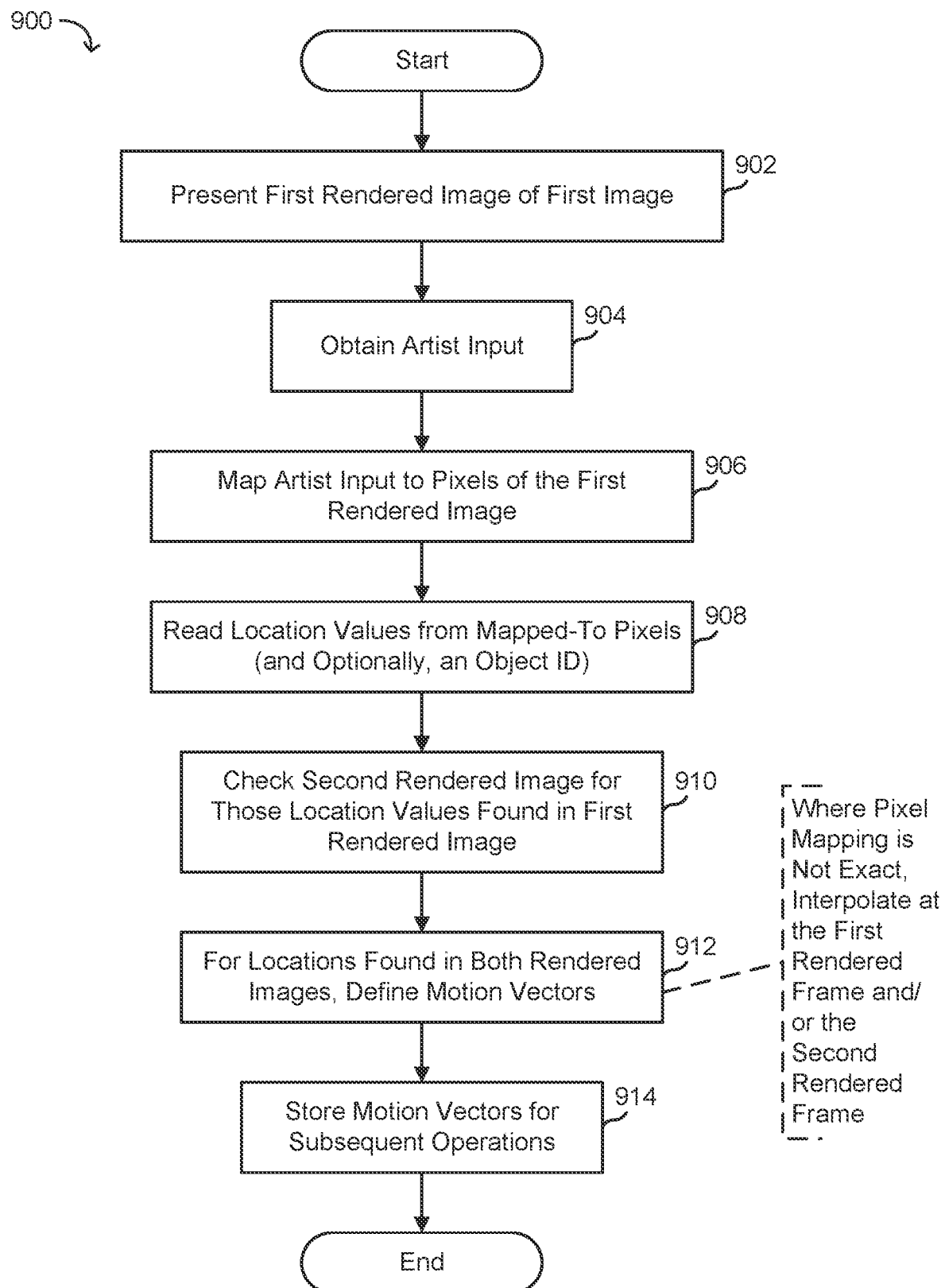
FIG. 9 illustrates a flowchart for processing computer-generated images via correspondence vector approach, according to an embodiment.

FIG. 9 illustrates a flowchart 900 for processing computer-generated images via correspondence vector approach, according to an embodiment. In a first step 902, an artist is presented with a first rendered image and in step 904, and image editing system obtains artist input. At step 906, the image editing system maps the artist input to pixels of the first rendered image. This might be done by noting which pixels of the first rendered image the artist selected for editing. Editing might be for the insertion of an overlay object, such as a tattoo, or other overlay, or for determining motion effects or the like.

At step 908, the image editing system reads location values from the data structures for those pixels, wherein the location values indicate locations on objects in the scene used to render the first rendered image with the locations being relative to an object reference frame. At step 910, the image editing system might check a second rendered image for pixel having those same locations or nearby locations thus indicating pixels in the second rendered image that might be pixels in corresponding to an object rendered in the first rendered image. From those correspondences, the image editing system can define, at step 912, motion vectors wherein a motion vector represents a matching of a pixel in the first rendered image and a pixel in the second rendered image based on the fact that those to pixels were rendered from the same or a neighboring location on an object in the scene geometry.

At step 914, the image editing system can store those motion vectors for subsequent operations. An example of subsequent operations might include adding motion effects, aligning an overlay from image to image or frame to frame, or other operations.

Figure 10:
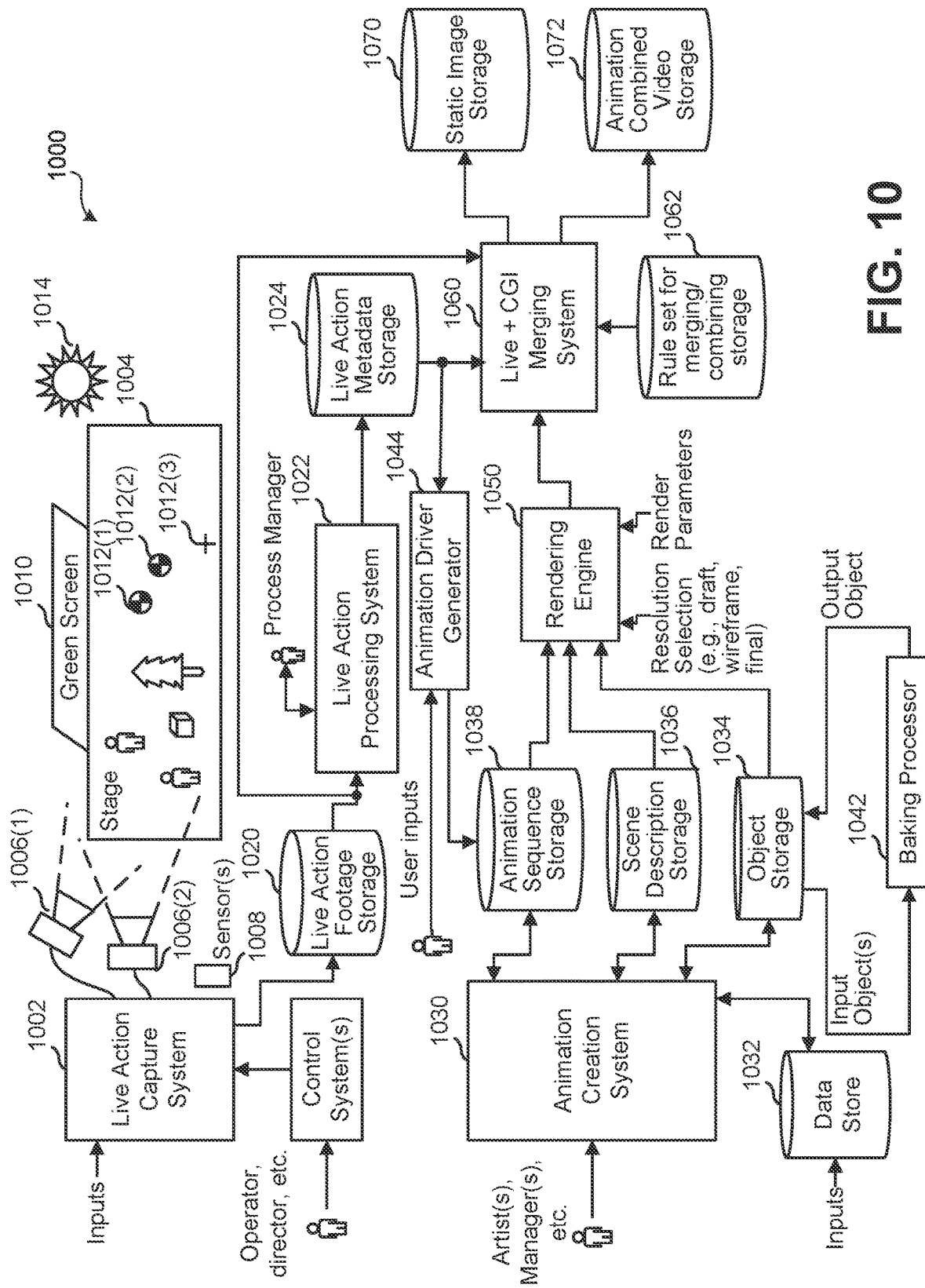
FIG. 10 illustrates an example visual content generation system as might be used to generate imagery in the form of still images and/or video sequences of images, according to various embodiments.

FIG. 10 illustrates the example visual content generation system 1000 as might be used to generate imagery in the form of still images and/or video sequences of images. The visual content generation system 1000 might generate imagery of live action scenes, computer generated scenes, or a combination thereof. In a practical system, users are provided with tools that allow them to specify, at high levels and low levels where necessary, what is to go into that imagery.

For example, a user might be an animation artist and might use the visual content generation system 1000 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 1000 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows. Images might or might not be stored in a compressed format, but either way, a desired image may be represented as a two-dimensional array of pixel color values. In another variation, images are represented by a pair of stereo images for three-dimensional presentations and in other variations, some of the image output, or all of it, might represent three-dimensional imagery instead of just two-dimensional views.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 10, a live action capture system 1002 captures a live scene that plays out on a stage 1004. The live action capture system 1002 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 1006(1) and 1006(2) capture the scene, while in some systems, there might be other sensor(s) 1008 that capture information from the live scene (e.g., infrared cameras, infrared sensors, motion capture ("mo-cap") detectors, etc.). On the stage 1004, there might be human actors, animal actors, inanimate objects, background objects, and possibly an object such as a green screen 1010 that is designed to be captured in a live scene recording in such a way that it is easily overlaid with computer-generated imagery. The stage 1004 might also contain objects that serve as fiducials, such as fiducials 1012(1)-(3), that might be used post-capture to determine where an object was during capture. A live action scene might be illuminated by one or more lights, such as an overhead light 1014.

During or following the capture of a live action scene, the live action capture system 1002 might output live action footage to a live action footage storage 1020. A live action processing system 1022 might process live action footage to generate data about that live action footage and store that data into a live action metadata storage 1024. The live action processing system 1022 might include computer processing capabilities, image processing capabilities, one or more processors, program code storage for storing program instructions executable by the one or more processors, as well as user input devices and user output devices, not all of which are shown. The live action processing system 1022 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of the overhead light 1014, as that might be useful in post-processing to match computer-generated lighting on objects that are computer-generated and overlaid on the live action footage. The live action processing system 1022 might operate autonomously, perhaps based on predetermined program instructions, to generate and output the live action metadata upon receiving and inputting the live action footage. The live action footage can be camera-captured data as well as data from other sensors.

An animation creation system 1030 is another part of the visual content generation system 1000. The animation creation system 1030 might include computer processing capabilities, image processing capabilities, one or more processors, program code storage for storing program instructions executable by the one or more processors, as well as user input devices and user output devices, not all of which are shown. The animation creation system 1030 might be used by animation artists, managers, and others to specify details, perhaps programmatically and/or interactively, of imagery to be generated. From user input and data from a database or other data source, indicated as a data store 1032, the animation creation system 1030 might generate and output data representing objects (e.g., a horse, a human, a ball, a teapot, a cloud, a light source, a texture, etc.) to an object storage 1034, generate and output data representing a scene into a scene description storage 1036, and/or generate and output data representing animation sequences to an animation sequence storage 1038.

Scene data might indicate locations of objects and other visual elements, values of their parameters, lighting, camera location, camera view plane, and other details that a rendering engine 1050 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 1030 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 1034 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from the data store 1032 might be used to drive object presentation. For example, if an artist is creating an animation of a spaceship passing over the surface of the Earth, instead of manually drawing or specifying a coastline, the artist might specify that the animation creation system 1030 is to read data from the data store 1032 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 1044 might read in live action metadata, such as data representing movements and positions of body parts of a live actor during a live action scene. The animation driver generator 1044 might generate corresponding animation parameters to be stored in the animation sequence storage 1038 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 1022. The animation driver generator 1044 might convert that movement data into specifications of how joints of an articulated CGI character are to move over time.

A rendering engine 1050 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. The rendering engine 1050 might include computer processing capabilities, image processing capabilities, one or more processors, program code storage for storing program instructions executable by the one or more processors, as well as user input devices and user output devices, not all of which are shown.

The visual content generation system 1000 can also include a merging system 1060 that merges live footage with animated content. The live footage might be obtained and input by reading from the live action footage storage 1020 to obtain live action footage, by reading from the live action metadata storage 1024 to obtain details such as presumed segmentation in captured images segmenting objects in a live action scene from their background (perhaps aided by the fact that the green screen 1010 was part of the live action scene), and by obtaining CGI imagery from the rendering engine 1050.

A merging system 1060 might also read data from rulesets for merging/combining storage 1062. A very simple example of a rule in a ruleset might be "obtain a full image including a two-dimensional pixel array from live footage, obtain a full image including a two-dimensional pixel array from the rendering engine 1050, and output an image where each pixel is a corresponding pixel from the rendering engine 1050 when the corresponding pixel in the live footage is a specific color of green, otherwise output a pixel value from the corresponding pixel in the live footage."

The merging system 1060 might include computer processing capabilities, image processing capabilities, one or more processors, program code storage for storing program instructions executable by the one or more processors, as well as user input devices and user output devices, not all of which are shown. The merging system 1060 might operate autonomously, following programming instructions, or might have a user interface or programmatic interface over which an operator can control a merging process. In some embodiments, an operator can specify parameter values to use in a merging process and/or might specify specific tweaks to be made to an output of the merging system 1060, such as modifying boundaries of segmented objects, inserting blurs to smooth out imperfections, or adding other effects. Based on its inputs, the merging system 1060 can output an image to be stored in a static image storage 1070 and/or a sequence of images in the form of video to be stored in an animated/combined video storage 1072.

Thus, as described, the visual content generation system 1000 can be used to generate video that combines live action with computer-generated animation using various components and tools, some of which are described in more detail herein. While the visual content generation system 1000 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 11:
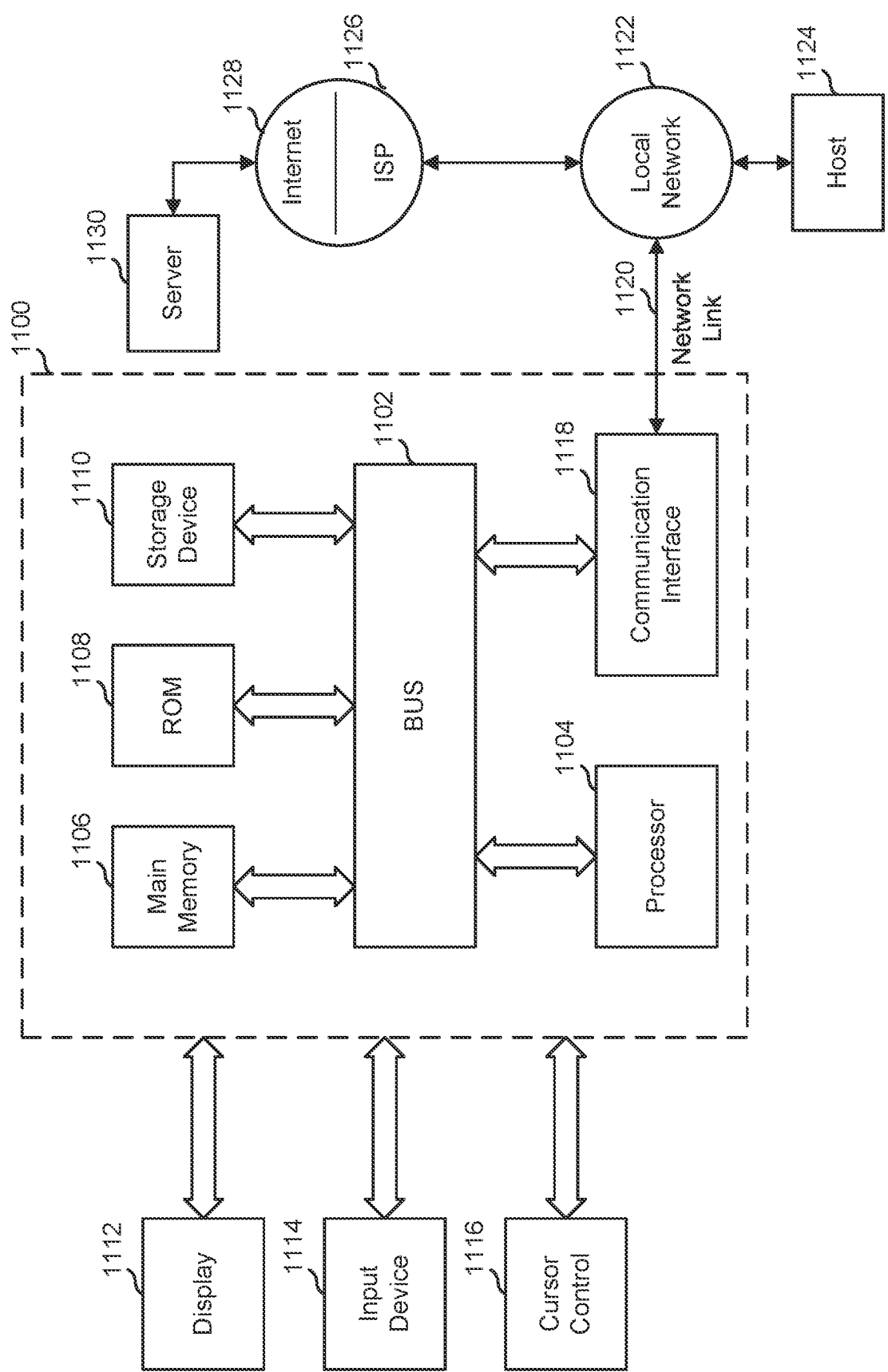
FIG. 11 is a block diagram illustrating an example computer system upon which computer systems of the systems illustrated in FIGS. 3 and 10 may be implemented.

For example, FIG. 11 is a block diagram that illustrates a computer system 1100 upon which the computer systems of the systems described herein and/or the visual content generation system 1000 (see FIG. 10) may be implemented. The computer system 1100 includes a bus 1102 or other communication mechanism for communicating information, and a processor 1104 coupled with the bus 1102 for processing information. The processor 1104 may be, for example, a general-purpose microprocessor.

The computer system 1100 also includes a main memory 1106, such as a random-access memory (RAM) or other dynamic storage device, coupled to the bus 1102 for storing information and instructions to be executed by the processor 1104. The main memory 1106 may also be used for storing temporary variables or other intermediate information during execution of instructions to be executed by the processor 1104. Such instructions, when stored in non-transitory storage media accessible to the processor 1104, render the computer system 1100 into a special-purpose machine that is customized to perform the operations specified in the instructions.

The computer system 1100 further includes a read only memory (ROM) 1108 or other static storage device coupled to the bus 1102 for storing static information and instructions for the processor 1104. A storage device 1110, such as a magnetic disk or optical disk, is provided and coupled to the bus 1102 for storing information and instructions.

The computer system 1100 may be coupled via the bus 1102 to a display 1112, such as a computer monitor, for displaying information to a computer user. An input device 1114, including alphanumeric and other keys, is coupled to the bus 1102 for communicating information and command selections to the processor 1104. Another type of user input device is a cursor control 1116, such as a mouse, a trackball, or cursor direction keys for communicating direction information and command selections to the processor 1104 and for controlling cursor movement on the display 1112. This input device typically has two degrees of freedom in two axes, a first axis (e.g., x) and a second axis (e.g., y), that allows the device to specify positions in a plane.

The computer system 1100 may implement the techniques described herein using customized hard-wired logic, one or more ASICs or FPGAs, firmware and/or program logic which in combination with the computer system causes or programs the computer system 1100 to be a special-purpose machine. According to one embodiment, the techniques herein are performed by the computer system 1100 in response to the processor 1104 executing one or more sequences of one or more instructions contained in the main memory 1106. Such instructions may be read into the main memory 1106 from another storage medium, such as the storage device 1110. Execution of the sequences of instructions contained in the main memory 1106 causes the processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as the storage device 1110. Volatile media includes dynamic memory, such as the main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 1102. Transmission media can also take the form of acoustic or light waves, such as those generated during radio-wave and infra-red data communications.

Various forms of media may be involved in carrying one or more sequences of one or more instructions to the processor 1104 for execution. For example, the instructions may initially be carried on a magnetic disk or solid-state drive of a remote computer. The remote computer can load the instructions into its dynamic memory and send the instructions over a network connection. A modem or network interface local to the computer system 1100 can receive the data. The bus 1102 carries the data to the main memory 1106, from which the processor 1104 retrieves and executes the instructions. The instructions received by the main memory 1106 may optionally be stored on the storage device 1110 either before or after execution by the processor 1104.

The computer system 1100 also includes a communication interface 1118 coupled to the bus 1102. The communication interface 1118 provides a two-way data communication coupling to a network link 1120 that is connected to a local network 1122. For example, the communication interface 1118 may be a network card, a modem, a cable modem, or a satellite modem to provide a data communication connection to a corresponding type of telephone line or communications line. Wireless links may also be implemented. In any such implementation, the communication interface 1118 sends and receives electrical, electromagnetic, or optical signals that carry digital data streams representing various types of information.

The network link 1120 typically provides data communication through one or more networks to other data devices. For example, the network link 1120 may provide a connection through the local network 1122 to a host computer 1124 or to data equipment operated by an Internet Service Provider (ISP) 1126. The ISP 1126 in turn provides data communication services through the world-wide packet data communication network now commonly referred to as the "Internet" 1128. The local network 1122 and Internet 1128 both use electrical, electromagnetic, or optical signals that carry digital data streams. The signals through the various networks and the signals on the network link 1120 and through the communication interface 1118, which carry the digital data to and from the computer system 1100, are example forms of transmission media.

The computer system 1100 can send messages and receive data, including program code, through the network(s), the network link 1120, and communication interface 1118. In the Internet example, a server 1130 might transmit a requested code for an application program through the Internet 1128, ISP 1126, local network 1122, and communication interface 1118. The received code may be executed by the processor 1104 as it is received, and/or stored in the storage device 1110, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for processing image data, the method comprising:
  under the control of one or more computer systems configured with executable instructions:
    obtain generated imagery comprising a plurality of frames representing objects of a geometric model positioned in a virtual scene space and their movement, if any, wherein the generated imagery is from a perspective of a camera position in the virtual scene space;
    obtain an artist selection of an input frame from among the plurality of frames;
    obtain an image insertion for inclusion onto, or relative to, the input frame;

determine an attachment object set, wherein the attachment object set comprises one or more objects of the geometric model that the image insertion is to track;

determine a set of point associations, wherein a first point association of the set of point associations is a first data structure representing (1) reference coordinates of a first point on a first object of the attachment object set, wherein a reference coordinate is a coordinate independent of at least one position change, in the virtual scene space, of the first object, (2) a second point on the image insertion, and (3) a position, in the input frame, of the second point relative to the first point, determine a second frame from among the plurality of frames distinct from the input frame; and determine a correspondence vector, for the point association, as between the input frame and the second frame, the correspondence vector representing changes in position in frame space of the first point from the input frame to the second frame.

2. The computer-implemented method of claim 1, further comprising using the correspondence vector to define a region in the second frame, wherein the correspondence vector maps position changes in the input frame relative to the second frame or position changes in the second frame relative to the input frame.

3. The computer-implemented method of claim 1, wherein the image insertion is a texture to be applied to the first object of the attachment object set.

4. The computer-implemented method of claim 1, wherein the attachment object set is determined based on artist input of object selection.

5. The computer-implemented method of claim 1, wherein the correspondence vector is determined as part of a motion vector determination over a plurality of motions in the virtual scene space.

6. The computer-implemented method of claim 1, wherein the correspondence vector represents motion of the camera position and motion of objects in the virtual scene space.

7. The computer-implemented method of claim 1, wherein the position, in the input frame, of the second point relative to the first point is a same position.

8. The computer-implemented method of claim 1, wherein the second frame is later in time in the plurality of frames relative to the input frame.

9. The computer-implemented method of claim 1, wherein the second frame is earlier in time in the plurality of frames relative to the input frame.

10. The computer-implemented method of claim 1, wherein the second frame is immediately preceding or succeeding in time relative to the input frame.

11. The computer-implemented method of claim 1, wherein the second frame is in a different time sequence but uses a shared set of reference coordinates with the input frame.

12. The computer-implemented method of claim 1, wherein the set of point associations consists of a single point association.

13. The computer-implemented method of claim 1, wherein the image insertion is represented by a texture map.

14. A non-transitory computer-readable storage medium storing instructions, which when executed by at least one processor of a computer system, causes the computer system to carry out the method of claim 1.

15. A non-transitory computer-readable medium carrying instructions, which when executed by at least one processor of a computer system, causes the computer system to carry out the method of claim 1.

16. A computer system for generating image data, the computer system comprising:

at least one processor; and a non-transitory computer-readable medium storing instructions, which when executed by the at least one processor, causes the computer system to:

obtain generated imagery comprising a plurality of frames representing objects of a geometric model positioned in a virtual scene space and their movement, if any, wherein the generated imagery is from a perspective of a camera position in the virtual scene space;

obtain an artist selection of an input frame from among the plurality of frames;

obtain an image insertion for inclusion onto, or relative to, the input frame;

determine an attachment object set, wherein the attachment object set comprises one or more objects of the geometric model that the image insertion is to track;

determine a set of point associations, wherein a first point association of the set of point associations is a first data structure representing (1) reference coordinates of a first point on a first object of the attachment object set, wherein a reference coordinate is a coordinate independent of at least one position change, in the virtual scene space, of the first object, (2) a second point on the image insertion, and (3) a position, in the input frame, of the second point relative to the first point, determine a second frame from among the plurality of frames distinct from the input frame; and determine a correspondence vector, for the point association, as between the input frame and the second frame, the correspondence vector representing changes in position in frame space of the first point from the input frame to the second frame.

* * * * *

UNITED STATES PATENT AND TRADEMARK OFFICE
CERTIFICATE OF CORRECTION

| | | |
|---|---|---|
| PATENT NO. | : 11,145,109 B1 | Page 1 of 1 |
| APPLICATION NO. | : 17/221119 | |
| DATED | : October 12, 2021 | |
| INVENTOR(S) | : Peter M. Hillman | |

It is certified that error appears in the above-identified patent and that said Letters Patent is hereby corrected as shown below:

In the Claims

Column 17, Line 13, Claim 1, Change "relative to the first point," to --relative to the first point;--.

Column 18, Line 45, Claim 16, Change "relative to the first point," to --relative to the first point;--.

Signed and Sealed this
Tenth Day of October, 2023

Katherine Kelly Vidal
*Director of the United States Patent and Trademark Office*